United States Patent
Jensen et al.

(10) Patent No.: US 8,176,754 B2
(45) Date of Patent: May 15, 2012

(54) PROCESS AND APPARATUS FOR MAKING MINERAL FIBRES

(75) Inventors: Leif Moeller Jensen, Roskilde (DK); Ole Andreasen, Farum (DK); Hans Hoyer, Roskilde (DK); Trine Frickmann, Fredensborg (DK); Lars Boellund, Slangerup (DK)

(73) Assignee: Rockwool International A/S, Hedehusene (DK)

( * ) Notice: Subject to any disclaimer, the term of this patent is extended or adjusted under 35 U.S.C. 154(b) by 628 days.

(21) Appl. No.: 10/480,200

(22) PCT Filed: Jun. 26, 2002

(86) PCT No.: PCT/EP02/07062
§ 371 (c)(1),
(2), (4) Date: Apr. 23, 2004

(87) PCT Pub. No.: WO03/002469
PCT Pub. Date: Jan. 9, 2003

(65) Prior Publication Data
US 2005/0172677 A1    Aug. 11, 2005

Related U.S. Application Data

(60) Provisional application No. 60/301,754, filed on Jun. 27, 2001.

(30) Foreign Application Priority Data

Jun. 27, 2001 (GB) ................................. 0115760.1
Dec. 3, 2001 (EP) ..................................... 01310090

(51) Int. Cl.
*C03B 37/05* (2006.01)

(52) U.S. Cl. ............................................. 65/459; 65/482
(58) Field of Classification Search .................... 65/482, 65/459
See application file for complete search history.

(56) References Cited

U.S. PATENT DOCUMENTS

| 1,815,890 | A | * | 7/1931 | Brockway | ....................... 432/13 |
| 3,855,951 | A | | 12/1974 | Giles | |
| 3,880,639 | A | | 4/1975 | Bodner et al. | |
| 4,062,667 | A | | 12/1977 | Hatanaka et al. | |
| 4,113,459 | A | | 9/1978 | Mattmuller | |
| 4,135,904 | A | | 1/1979 | Suzuki et al. | |
| 4,310,342 | A | * | 1/1982 | Richards | ............................ 65/27 |
| 4,358,304 | A | * | 11/1982 | Froberg | ............................ 65/27 |
| 4,365,984 | A | | 12/1982 | Gee | |

(Continued)

FOREIGN PATENT DOCUMENTS
DE    19707891    9/1998
(Continued)

OTHER PUBLICATIONS

"Pyroflux Process Glass Production Economic Estimates" Boletin De La Sociedad Espanola de Ceramica y Vidrio, Madrid, Es, vol. 31, No. 3, May 1, 1992 pp. 256-257.

*Primary Examiner* — John Hoffmann
(74) *Attorney, Agent, or Firm* — Dickstein Shapiro LLP

(57) ABSTRACT

Particulate mineral material suitable for forming a fiberisable melt is melted in a flame formed by combustion of powdered carbonaceous fuel with preheated air and the particulate mineral material is then preheated, and the exhaust gases are subjected to NOx reduction, in a cyclone preheater (22).

12 Claims, 2 Drawing Sheets

U.S. PATENT DOCUMENTS

Figure 1:
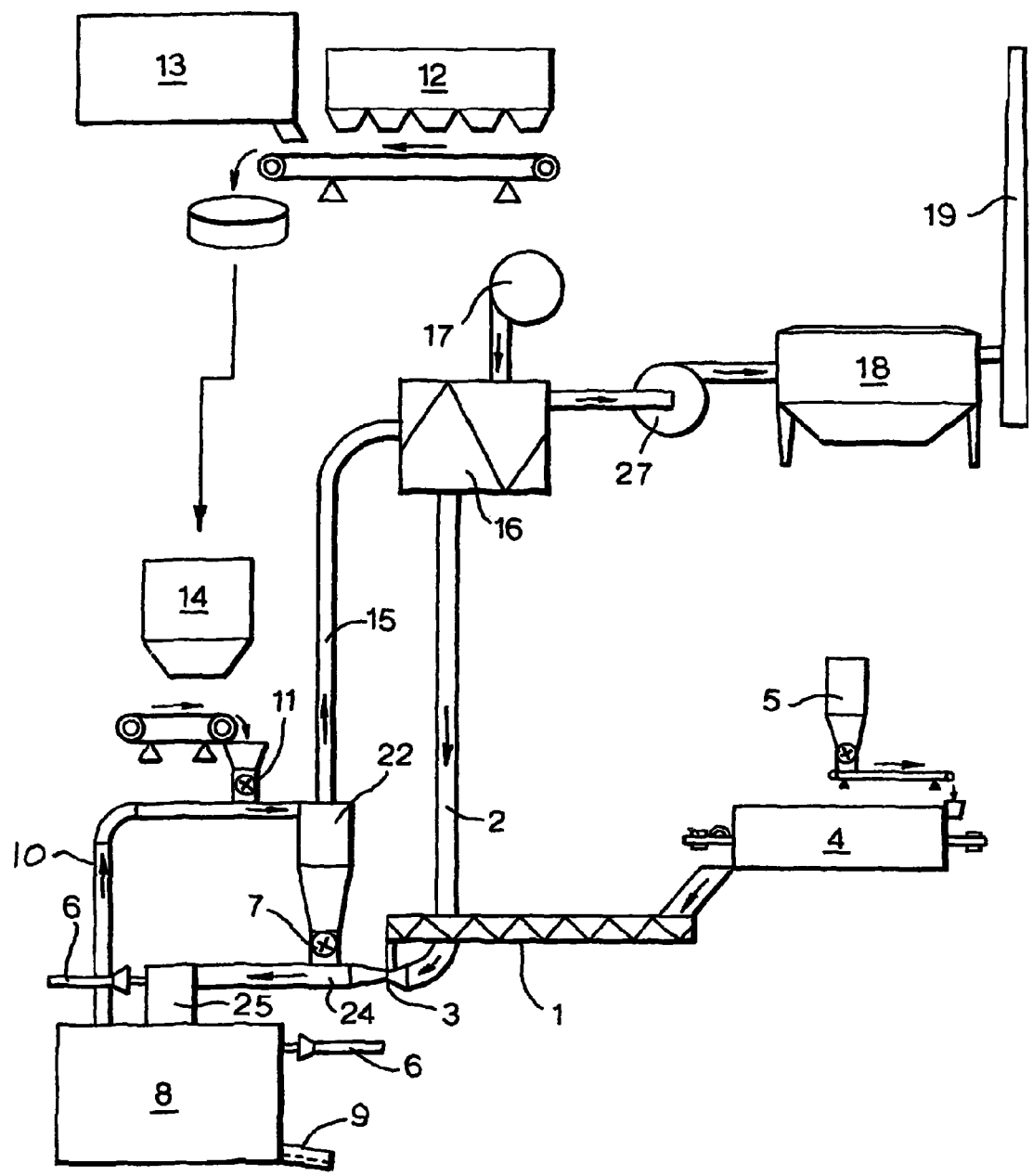

| | | | |
|---|---|---|---|
| 4,372,770 A * | 2/1983 | Krumwiede et al. | 65/27 |
| 4,544,394 A | 10/1985 | Hnat | |
| 4,553,997 A | 11/1985 | Hnat | |
| 4,631,080 A * | 12/1986 | Westra et al. | 65/136.1 |
| 4,752,314 A | 6/1988 | Fassbender et al. | |
| 4,877,449 A | 10/1989 | Khinkis | |
| 4,957,527 A | 9/1990 | Hnat | |
| 5,114,122 A | 5/1992 | Hnat | |
| 5,632,795 A * | 5/1997 | Brown et al. | 65/157 |
| 5,882,372 A * | 3/1999 | Brown et al. | 65/505 |
| 5,979,191 A * | 11/1999 | Jian | 65/490 |
| 6,029,477 A * | 2/2000 | Hanvey, Jr. | 65/483 |
| 6,237,368 B1 * | 5/2001 | Beisswenger et al. | 65/29.12 |
| 6,289,694 B1 * | 9/2001 | Pieper | 65/29.19 |

FOREIGN PATENT DOCUMENTS

| | | |
|---|---|---|
| EP | 0882488 | 9/1998 |
| JP | 52-144017 | 12/1977 |
| WO | WO-9950196 | 10/1999 |

* cited by examiner

PROCESS AND APPARATUS FOR MAKING MINERAL FIBRES

This application is a United States national filing under 35 USC 371 of international (PCT) application No. PCT/EP02/07062, filed Jun. 26, 2002, claiming priority to: U.S. Provisional Application No. 60/301,754, filed Jun. 27, 2001; GB Application, 0115760.1, filed 27 Jun. 2001; and EPO application 01310090.4, filed 3 Dec. 2001.

This invention relates to the production of mineral fibres by burning combustible material in the presence of inorganic particulate material and thereby forming a melt, and then fiberising this melt to form the fibres.

When the fibres are glass fibres, the melt is typically formed by adding inorganic particulate material to a preformed pool of melt in an electric or other tank furnace. This is appropriate having regard to the chemistry, physical properties and economics of the manufacture of glass fibres, typically having a chemical analysis, by weight of oxides, of above 10% $Na_2O+K_2O$, below 3% iron as FeO, below 20% CaO+Mgo, above 50% $SiO_2$ and below 5% $Al_2O_3$, and often also some boron. However this system is not practical nor economic, having regard to the melt temperature, other physical properties and economics, for the manufacture of rock, stone or slag fibres, typically having an analysis, by weight of oxides, of below 10% $Na_2O+K_2O$, above 20% CaO+MgO above 3% iron as FeO, and below 50% $SiO_2$ and, often, above 10% $Al_2O_3$, and usually boron in, at most, trivially small amounts.

The normal way of producing the melt for slag, stone or rock fibres is by means of a shaft furnace in which a self-supporting stack of inorganic particulate material is heated by combustion of combustible material in the furnace. The stack gradually melts and is replenished from on top, with melt draining down the stack and out from the bottom of the furnace. The normal furnace for this purpose is a cupola furnace.

It is necessary for the stack to be self-supporting and permeable to the combustion gases, which are generally generated by combustion of carbonaceous material in the stack. It is therefore necessary that everything in the stack is relatively coarse (in order that the stack is permeable) and has high physical strength and does not collapse until combustion or melting is well advanced. In practice this means that the carbonaceous material is coke and the particulate material is either coarsely crushed rock, stone or slag or is in the form of briquettes formed from fine particulate material.

Accordingly, if the material which is available is only available in finely divided form, it is necessary to incur the expense and inconvenience of forming it into briquettes. Briquetting usually uses sulphur-containing materials as binder, such as Portland cement with gypsum, and this means that the effluent is liable to have a high sulphur content, which has to be treated. The gas would typically contain $H_2S$ and CO if it is not subjected to after-burning.

For this, and other reasons, it is generally necessary to subject the effluent gases from the cupola furnace to an after-burning stage, in order that the gases which are discharged into the atmosphere are environmentally satisfactory, and it would be desirable to be able to avoid the need for using an after-burner.

The cupola or other stack furnace system also has the disadvantage that conditions in the furnace always tend to be sufficiently reducing that some of the iron is reduced to metallic iron. This necessitates separating metallic iron from the melt, reduces wool production, leads to the provision of iron waste and also tends to incur the risk of corrosion in the zone containing iron and slag.

Another disadvantage is that the process does not have high thermal efficiency.

Despite these disadvantages, the process using a cupola or other stack furnace has been widely adopted throughout the world for the manufacture of rock, stone or slag fibres, e.g., having the analysis given above.

Nevertheless, it would clearly be desirable, and has been desirable for a long time, to devise a system which avoids some or all of these disadvantages. Thus the invention aims to provide a system which has high thermal efficiency and which provides an environmentally satisfactory effluent, preferably without the use of an after-burner or other special pollution-controlling effluent treatment. It is also desirable that the system does not result in reduction of iron and does not necessitate briquetting.

Almost twenty years ago U.S. Pat. No. 4,365,984 proposed the manufacture of slag, stone or rock fibres by an entirely different process. This involves suspending powdered coal in preheated combustion air and combusting the suspended coal in the presence of suspended particulate mineral material in a circulating combustion chamber, i.e., a combustion chamber in which the suspended particulate materials and air circulate in a system which is or approaches a cyclone circulation system.

This process results in the formation of a mineral melt and hot exhaust gases. The melt is collected in a tank and a stream of melt is then fiberised by centrifugal fiberising apparatus. The hot exhaust gases are utilised for preheating the combustion air, before it is mixed with the coal, by heat exchange between air and the exhaust gases. In this process, the combustion air which is mixed with the coal and the particulate material is described as having a temperature between 430 and 650° C. and the flame temperature in the furnace is described as being between 1500 and 1900° C. Preferably some or all of the inorganic particulate material is provided as part of the suspended coal, as a result of using waste coal tailings from a fine coal washing circuit.

Although the process would, in theory, be operable, and would avoid the need of briquetting and would probably eliminate the risk of reduction of iron, the process as described is clearly subject to major environmental effluent problems and is of low efficiency. Accordingly, in practice it is neither economically nor environmentally competitive with the conventional shaft furnace processes and so the circulating combustion chamber technology has not been developed for the manufacture of slag or rock fibres. This is despite the fact that there have been numerous publications of circulating combustion chamber technology for various mineral products in the intervening twenty years.

One particular environmental effluent problem which is likely to arise is the presence of NOx in the exhaust gases. The reducing conditions in a cupola tend to minimise this problem but the less reducing conditions, and in particular the described oxidising conditions, that would prevail in the circulating combustion chamber are liable, at the high temperatures of the process, to result in the effluent gases containing a significant amount of NOx, and this would create a major environmental problem.

It would be desirable to be able to avoid this and other environmental problems of processes using non-reducing conditions in the combustion chamber, and to avoid the various technical and economic and environmental problems associated with cupola and other shaft furnaces.

According to the invention, we provide a process for making a mineral melt which can be used for making mineral fibres and which comprises suspending powdered carbonaceous fuel in preheated combustion air and combusting the suspended carbonaceous fuel to form a flame, suspending in the flame mineral material which has been preheated to at least 700° C. and melting the mineral material in a circulating combustion chamber and thereby forming mineral melt and hot exhaust gas, separating the hot exhaust gas from the melt and collecting the melt, contacting the exhaust gas from the melt in a cyclone preheater under NOx reducing conditions with the particulate mineral material which is to be preheated and melted and thereby reducing NOx in the exhaust gas and providing the particulate mineral material which has been preheated to at least 700° C., and preheating the combustion air by heat exchange of air with the exhaust gas from the cyclone preheater.

The invention includes the described process of making the melt wherein the collected melt is then taken as a stream to a fiberising apparatus, usually a centrifugal fiberising apparatus, and is fiberised to fibres which are then collected, for instance as a web and converted into bonded or other mineral wool products in conventional manner. The composition of the melt is generally such that the fibres are of the type which are conventionally described as slag, stone or rock fibres.

The invention also includes processes in which the collected melt can be used for some entirely different purpose, for instance for the manufacture of cast products.

The invention also includes the plant which is used for making the melt, such as the means for forming the flame and for feeding the particulate mineral material into the flame and the circulating combustion chamber for this, and the recycling system including the cyclone preheater.

It is easily possible to operate the process so that it is economically and environmentally advantageous compared to conventional processes using a shaft furnace. In particular, it is possible to operate the process in a cost-effective manner to provide melt which is free of reduced iron and exhaust gases which are substantially free of NOx and other undesirable impurities or which have a level of contamination which is sufficiently low that it is environmentally acceptable.

The NOx reducing conditions are preferably generated by including in the cyclone preheater nitrogenous material which will reduce NOx under the conditions prevailing in the preheater. The nitrogenous material may be included in the hot exhaust gas which is fed to the preheater or may be added direct to the preheater.

The nitrogenous material which is included in the preheater cyclone is preferably ammonia or ammonium compound, an amine or urea, wherein the urea may be free or, more preferably, is a resinous product such as a urea formaldehyde or phenol urea formaldehyde resin. It is particularly preferred that the NOx reducing conditions are generated by including in the particulate material waste bonded mineral wool which is fed to the preheater cyclone, wherein the waste bonded mineral wool contains a urea resin (usually phenol urea resin) and/or ammonia or an ammonium compound (for instance as a buffering agent for resin in the waste wool). Thus, by the invention, it is possible simultaneously to utilise waste material and to react it under appropriate conditions so as to reduce a significant amount of the NOx in the exhaust gases to nitrogen.

The amount of ammonia or ammonia derivative or other NOx-reducing compound is preferably 1 to 4 (preferably 1-2 or, especially, 1-1.7) moles per mole NOx and the reaction is preferably conducted at a temperature of 800° C. to 1050° C. The reaction residence time is preferably at least 0.3. seconds and most preferably at least 1 second. Typically this can be the residence time of the particulate mineral material in the cyclone preheater, and/or the ducting, until the exhaust gas is cooled below reaction temperature, e.g., below 800° C. Under these conditions, preferably with a temperature in the range 800 to 1050° C., substantially all the NOx is reduced to nitrogen, even though the atmosphere in the preheater is preferably oxidising.

Thus, according to another preferred feature of the invention the gaseous atmosphere in the cyclone preheater contains excess oxygen, preferably in an amount of at least 1% or 2% and most preferably at least 4%, for instance up to 8% by volume. by weight of the gaseous atmosphere. Despite the oxidising nature of the atmosphere, NOx is reduced by the added ammonia or other nitrogenous compound under the conditions defined for the preheater.

The preheater can thus simultaneously operate as a NOx reducer and an oxidising after-burner to burn pollutants such as hydrogen sulphide and carbon monoxide from the circulating combustion chamber.

Preferably the exhaust gases which are separated from the melt and which are then fed to the cyclone preheater contain less oxygen than the amount which is present in the cyclone preheater and so preferably air or other source of oxygen is added to the exhaust gases either in the preheater or between the melt and the preheater.

Preferably the combustion in the circulating combustion chamber is near stoichiometric or even sub-stoichiometric. As a result of this, the amount of NOx generated during the combustion is minimised. The ratio of oxygen to combustible material is generally from 0.8 to 1, most preferably 0.85 to 0.99, often around 0.92 to 0.97.

Thus, in preferred process and apparatus according to the invention the combustion of the carbonaceous particulate material and the melting of the particulate mineral material is conducted under slightly sub-stoichiometric conditions and the exhaust gas from this is then adjusted to be slightly oxidising and the exhaust gases are then, in a single operation, both subject to oxidising after burning and to NOx reduction, in a cyclone preheater.

The temperature of the exhaust gases when they are separated from the melt is preferably 1400 to 1700° C., often 1500 to 1600° C. The temperature of the gases entering the cyclone preheater is generally in the range 1000 to 1500° C. When, as is normal, this temperature is less than the temperature of the gas when it leaves the melt, the reduction in temperature can be achieved by dilution with air and/or liquid ammonia. The proportions of the inflowing exhaust gas and the particulate mineral material should be such that the mineral material is preheated to the desired temperature, typically 700° or 800 to 1050° C., in the cyclone preheater.

The exhaust gases from the preheater cyclone are used for preheating the air for the combustion of the carbonaceous material and generally the gases have a temperature in the range 800 to 900° C. when they emerge from the preheater cyclone. They are preferably used for heat exchange with the incoming combustion air so as to preheat that air to a temperature of at least 500° C. and preferably 600 to 900, most preferably around 700 to 800° C.

The carbonaceous material which is used as the fuel can be any particulate carbonaceous material that has a suitable calorific value. This value can be relatively low, for instance as low as 10000 kJ/kg or even as low as 5000 kJ/kg. Thus it may be, for instance, dried sewage sludge or paper waste. Preferably it has higher calorific value and may be spent pot liner from the aluminium industry, coal containing waste such as coal tailings, or powdered coal.

The fuel and air is preferably such that the adiabatic flame temperature (i.e., the temperature that would be achieved from the fuel and air if there is no exchange of enthalpy with particulate mineral material or other surroundings) is in the range 1800° C. to 2500° C. or more, preferably in the range 2000 to 2500° C.

It is desirable to start the combustion of the carbonaceous material in the preheated air before adding the preheated particulate material into the flame so as to allow the flame temperature to become relatively high before the cooler particulate mineral material is added, since otherwise efficiency may be reduced significantly. Preferably the flame temperature is at least about 1000° C. and preferably at least 1200° C. before the preheated mineral material is added to it. However if the flame temperature is too high there will be increased production of NOx and so preferably the flame temperature is not above 1500° C. or 1600° C. at the time when the particulate mineral material is added.

In general, materials and conditions are preferably such that the maximum temperature in the circulating combustion chamber and in the gases emerging from it is not more than 1600° C.

Figure 2:
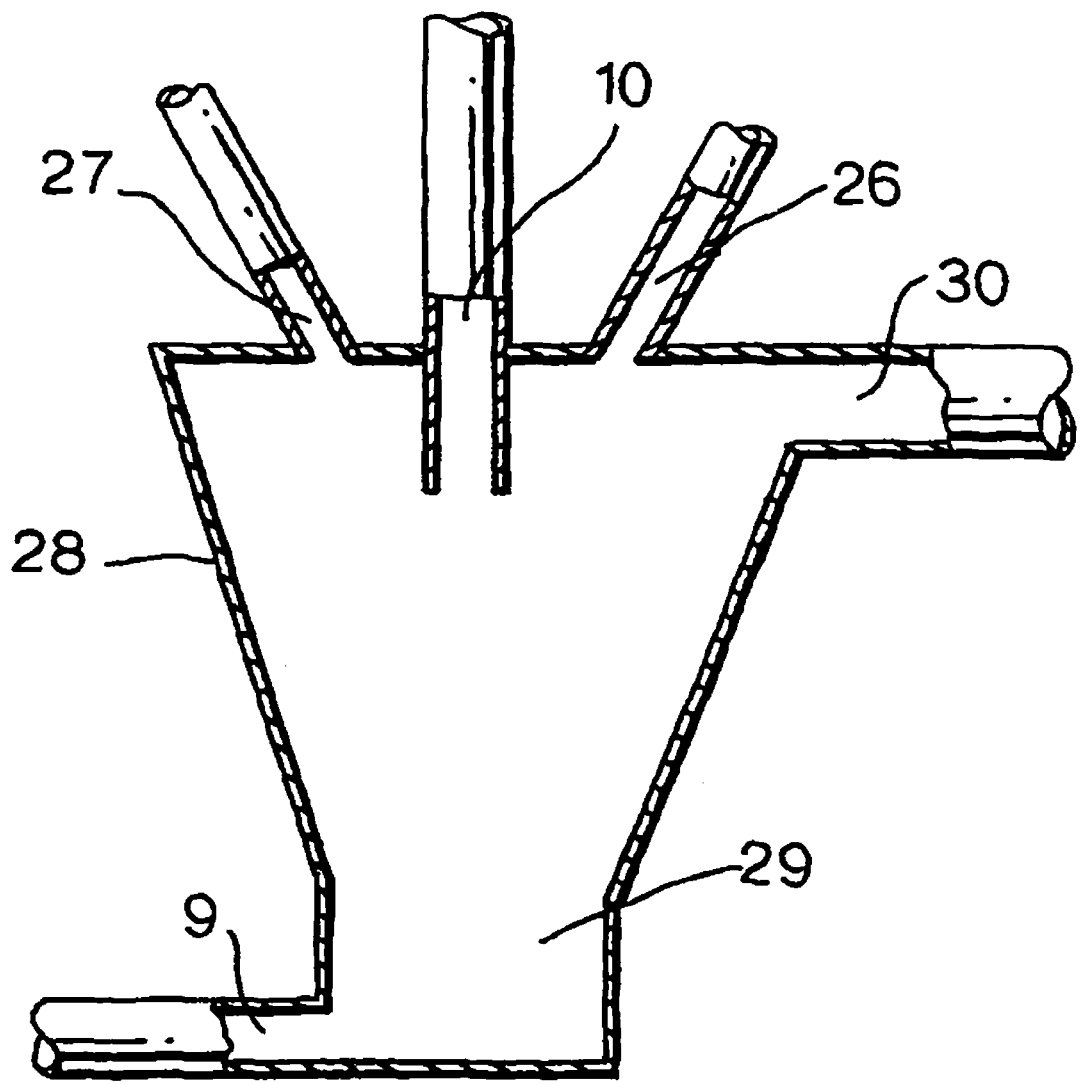

The invention is described below by reference so the accompanying drawings in which FIG. 1 is a flow-diagram showing one form of apparatus and method according to the invention and FIG. 2 is a diagram illustrating an alternative arrangement to replace the combustion chamber 25 and tank 8 in FIG. 1.

Powdered coal from a screw feed 1 or other feeder is injected into preheated combustion air from duct 2 using an injector 3.

The powdered coal in screw feed 1 may be coal fines but preferably some, and usually at least 50% and preferably at least 80% and usually all of the coal is made by milling lump coal, for instance using a ball mill 4, wherein the lump coal may be supplied from a silo 5. The coal, whether it is supplied initially as fines or lump, may be good quality coal or may be waste coal containing a high inorganic content, for instance 5 to 50% inorganic with the balance being carbon. Preferably the coal is mainly or wholly good quality coal for instance bituminous or sub-bituminous coal (ASTM D388 1984) and contains volatiles which promote ignition.

The coal or other carbonaceous fines which are injected into the preheated combustion air preferably have a particle size in the range from 50 to 1000 µm, preferably about 50-200, generally about 70 µm average size, with the range being 90% below 100 µm.

The preheated combustion air preferably has a temperature of from 500 to 800° C., most preferably 700° C. at a time when it is contacted with the powdered coal.

The resultant stream of coal suspended in air passes along duct 24 typically at a velocity of 20-40 m/s, and enters a circulating combustion chamber 25. One or more gas burners 6 may be provided at convenient places, for instance as shown in the flow diagram and/or in duct 24, to initiate combustion if this is necessary.

Particulate inorganic material is supplied by feeder 7 into the stream of powdered coal suspended in air in the duct 24.

The pressure in the combustion chamber 25 is usually higher than the pressure in the cyclone 22 and so it is necessary for the feeder 7 to be constructed to insure that the solids flow downwardly despite the increase in pressure. For instance the feeder 7 may comprise a screw feed which discharges through a weighted pressure valve or it may comprise a fluidised bed valve.

It is necessary to ensure that combustion of the coal has initiated before the particulate inorganic material is added, as otherwise inferior and inefficient combustion may occur. In practice the temperature of the flame is generally at least 1200° C. and preferably not more than 1500° C. at the point where the particulate material is fed into the flame.

The particulate inorganic material is usually fed into the flame quite close to the circulating combustion chamber 25. In practice therefore the feeder 7 is usually close to the inlet to the chamber 25 and it may even be direct into the chamber 25.

It is not essential to have the horizontal duct 24 for the establishment of the flame since it is possible, by appropriate design of the chamber inlets, to inject the coal and preheated air direct into the chamber. It is also possible to feed the particulate material direct into the chamber at a position such that, the flame temperature is sufficiently high before the mineral particulate material contacts the flame.

The circulating combustion chamber 25 is of the type which is frequently referred to as a cyclone furnace. Preferably it is water cooled. The construction of suitable cyclone furnaces is described in various patents. including U.S. Pat. Nos. 3,855,951, 4,135,904, 4,553,997, 4,544,394, 4,957,527, 5,114,122 and 5,494,863.

Within the circulating combustion chamber 25, combustion of the particulate coal continues and the particulate mineral material is converted to melt while suspended in air. Melt and particulate material may be thrown on to the walls of the chamber and will flow down the chamber, predominantly as melt.

The circulating chamber 25 can be a horizontal or inclined-cyclone but often is vertical. It may lead downwardly into a tank for collecting melt. Preferably the chamber opens direct into the tank without going through a conical or other restricted exit duct of the type which is conventional in many systems, since providing a conical duct as the exit has no advantage and impedes flow from the base of the chamber.

The tank can be in the base of the chamber (for instance as described in U.S. Pat. No. 4,553,997) or it can be a settling tank 8 of considerably enhanced volume, as shown in FIG. 1. The settling tank 8 should have sufficient gas volume to allow for precipitation of the melt droplets from the exhaust gas and sufficient melt volume to ensure dissolution of particles, which may only be partly melted, and for homogenisation of the melt There may be a gas burner 6 or other means for applying extra energy to the settling tank if necessary, for instance to raise the temperature of the exhaust gases, especially during start up.

Melt is run off from the tank, when appropriate, through gutter 9 as a stream and may then be subjected to fiberisation in conventional manner, for instance using a cascade spinner or a spinning cup or any other conventional centrifugal fiberising process. Alternatively it may be run off to some other manufacturing process, e.g., a casting process.

Exhaust gases free of melt are taken from the circulating combustion chamber 25 or from the settling tank 8 into which the chamber discharges. They are taken direct from this chamber through duct 10.

Most or all of the particulate material which is to be melted is preheated by the exhaust gases, typically by being fed in particulate form into the flowing stream of exhaust gas in duct 10 by the feed 11, and the resultant suspension in gas is then passed into the preheater cyclone 22.

The particle size of the mineral material which is fed into the exhaust gases by the feed 11 is preferably in the range 0 to 10 mm, usually 0 to 4 mm, preferably 0 to 2 mm.

The rate of flow of the exhaust gas when the particulate material is suspended in them is generally in the range 10 to 40 m/s. He velocities refer to the dimension of the main tube, but the velocities may further be increased just at the feeding point by inserting a venturi section, whereby the velocity may reach values of 100 m/s or even more. The particulate material may be fed into the exhaust gas as it approaches the cyclone preheater, or in the cyclone preheater.

The particulate material which is fed in through feed 11 is supplied from hoppers 12 and 13, wherein hopper 13 is particularly important because it contains waste particulate material which contains a source of nitrogen, such as bonded mineral wool wherein the bonding agent is a urea resin. The various materials from hoppers 12 and 13, with additional pulverisation in a ball mill or other mill if necessary, are then blended and fed into a silo 14 and from this they are continuously discharged into the feed 11.

The exhaust gases in duct 10 approaching feed 11 will usually have been cooled down by dilution with air and/or ammonia (not shown) to a temperature of 1200° C. to 1500° C. suitable for preheating the particulate material in the cyclone 22 to a temperature in the range 700 to 1000° C., generally around 800° C.

These exhaust gases usually leave the cyclone 22 at a temperature in the range 800 to 1000° C., preferably around 900° C. At these temperature, there will be selective non-catalytic reduction of NOx predominantly to nitrogen, with the result that the exhaust gases from the cyclone 22, which leave through duct 15, will have a satisfactorily low NOx content and will preferably be substantially free of NOx.

They then pass through, a heat exchanger 16 by which there is indirect heat exchange with combustion air from ventilator 17, thus generating the desired stream of preheated combustion air through duct 2. The waste gas is vented through ventilator 27, and filter 18 to stack 19.

In the modification illustrated diagramatically in FIG. 2, the chamber 25 and tank 8 is replaced by a water cooled conical cyclone combustion chamber 28 having a relatively small collecting zone 29 at its base leading to a controllable gutter 9 for the discharge of melt. There is a tangential inlet 30 into the cyclone for the introduction of powdered coal or other particulate fuel and preheated air direct from injector 3 (in which event the flame is established within the cyclone 28) or from a duct 24 (in which event the flame will be established, at least partly, before entering the inlet 30). The feeder 7 discharges the preheated inorganic particulate material through one or more inlets 26 and 27 positioned in the cyclone chamber 28 such that the flame is established to an adequate temperature before it meets the inorganic material. Exhaust gas is taken off from the cyclone through outlet 10.

The invention claimed is:

1. A process for making mineral fibres comprising
providing a preheated combustion air,
suspending a powdered carbonaceous fuel in said preheated combustion air and combusting the suspended carbonaceous fuel to form a flame,
providing particulate mineral material which has been preheated to at least 700° C.,
suspending said preheated particulate mineral material in said flame and melting the mineral material in a circulating combustion chamber at an adiabatic flame temperature of at least 1800° C. and thereby forming a mineral melt and hot exhaust gases,
separating said hot exhaust gases from said mineral melt and collecting the melt,
flowing a stream of said collected melt to a centrifugal fiberising apparatus and forming mineral fibres by centrifugally fiberising the stream of melt,
wherein the preheating of the particulate mineral material is carried out by conveying said exhaust gases to a cyclone preheater and contacting said exhaust gases in said cyclone preheater under NOx-reducing conditions with (a) said particulate mineral material which is to be melted and (b) waste bonded mineral wool containing a source of nitrogen, and thereby both reducing NOx in the exhaust gases and preheating said particulate material to at least 700° C.,
removing the exhaust gases with reduced NOx from said cyclone preheater, and
wherein said combustion air is preheated by heat exchange of air with said exhaust gases with reduced NOx removed from the cyclone preheater, and
wherein the hot exhaust gases separated from the mineral melt have their temperature reduced from the temperature at the time they are separated from the mineral melt by dilution with at least one of air and liquid ammonia while being conveyed to the cyclone preheater and before contact with the particulate mineral material in the cyclone preheater.

2. A process according to claim 1 in which said cyclone preheater contains oxygen.

3. A process according to claim 1 in which the combustion is conducted under substoichiometric oxygen to fuel conditions.

4. A process according to claim 1 in which said NOx reducing conditions comprise a temperature of 700° C. to 1050° C. and the presence of said source of nitrogen.

5. A process according to claim 4 in which said cyclone preheater temperature is in the range of 800° C. to 1050° C.

6. A process according to claim 1 in which said circulating combustion chamber is a conical cyclone combustion chamber having an axial outlet for the exhaust gas from its top and an inlet for at least one of said powdered fuel, said preheated air, and said flame, said inlet being disposed non-radially into the top of the cyclone and an outlet for mineral melt from its base, and exhaust gas is removed via the axial outlet, at least one member selected from the group consisting of said powdered fuel, said preheated air and said flame are introduced via said inlet, and said melt is removed from said outlet for the mineral melt.

7. A process according to claim 6 in which said combustion chamber temperature is in the range of 800° C. to 1050° C.

8. A process according to claim 1 in which said preheated particulate mineral material is fed into the combustion chamber and is suspended in the flame in the combustion chamber.

9. A process according to claim 1 in which said source of nitrogen is selected from the group consisting of urea resin, ammonia and an ammonia compound.

10. A process according to claim 9 in which said source of nitrogen comprises a urea resin bonding agent for the waste bonded mineral wool.

11. A process according to claim 1 in which said exhaust gases temperature is reduced to at least 1500° C.

12. A process according to claim 11 in which said exhaust gases temperature reduction is effected by dilution of said exhaust gases with air.

* * * * *